United States Patent
Liang et al.

(10) Patent No.: US 6,882,929 B2
(45) Date of Patent: Apr. 19, 2005

(54) $NO_X$ EMISSION-CONTROL SYSTEM USING A VIRTUAL SENSOR

(75) Inventors: Cho Y. Liang, Lafayette, IN (US); Syamaia Srinivasan, Peoria, IL (US); Evan E. Jacobson, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 325 days.

(21) Appl. No.: 10/144,721

(22) Filed: May 15, 2002

(65) Prior Publication Data

US 2003/0216855 A1 Nov. 20, 2003

(51) Int. Cl.$^7$ ................................................. G06G 7/70
(52) U.S. Cl. ................ 701/115; 701/104; 701/114; 701/105; 701/101; 701/102; 701/108; 60/276; 60/277; 60/286; 60/284; 123/295; 123/382; 123/389; 123/463
(58) Field of Search .......................... 701/115, 104, 701/114, 103, 101, 105, 108, 102; 60/276, 277, 285, 286, 284; 123/295, 382, 389, 463

(56) References Cited

U.S. PATENT DOCUMENTS

| | | |
|---|---|---|
| 4,473,537 A | 9/1984 | Ford, Jr. et al. ............. 423/239 |
| 5,116,579 A | 5/1992 | Kobayashi et al. .......... 422/111 |
| 5,386,373 A | 1/1995 | Keeler et al. ................ 364/577 |
| 5,539,638 A | 7/1996 | Keeler et al. ........... 364/424.03 |
| 5,576,970 A | 11/1996 | Goto ........................... 364/500 |
| 5,584,172 A | 12/1996 | Oguchi et al. ................ 60/39.5 |
| 5,611,307 A * | 3/1997 | Watson ........................ 123/254 |
| 5,625,750 A | 4/1997 | Puskorius et al. |
| 5,682,317 A | 10/1997 | Keeler et al. .......... 364/431.03 |
| 5,703,777 A | 12/1997 | Buchhop et al. ...... 364/431.062 |
| 5,809,775 A | 9/1998 | Tarabulski et al. ............ 60/274 |
| 5,924,280 A | 7/1999 | Tarabulski .................... 60/274 |
| 5,970,426 A | 10/1999 | Mandel et al. ................. 702/23 |
| 5,983,628 A | 11/1999 | Borroni-Bird et al. ........ 60/274 |
| 6,017,503 A | 1/2000 | Kato et al. ................... 423/235 |
| 6,063,350 A | 5/2000 | Tarabulski et al. ....... 423/239.1 |
| 6,092,017 A | 7/2000 | Ishida et al. |
| 6,203,770 B1 | 3/2001 | Peter-Hoblyn et al. ..... 423/212 |
| 6,209,515 B1 | 4/2001 | Gotoh et al. ................. 123/305 |
| 6,236,908 B1 | 5/2001 | Cheng et al. |
| 6,360,159 B1 * | 3/2002 | Miller et al. ................. 701/103 |
| 6,363,312 B1 * | 3/2002 | Griffin ........................ 701/103 |
| 6,546,720 B1 * | 4/2003 | van Nieuwstadt ............ 60/286 |

FOREIGN PATENT DOCUMENTS

DE 10010745 A1 3/2002

* cited by examiner

Primary Examiner—Willis R. Wolfe
Assistant Examiner—Johnny H. Hoang
(74) Attorney, Agent, or Firm—Finnegan, Henderson, Farabow, Garrett & Dunner (57) ABSTRACT

A method and system may be provided to perform a process for controlling $NO_x$ emissions of an target engine. In one embodiment of the invention, the process may include determining predicted $NO_x$ values based on a model reflecting a predetermined relationship between control parameters and $NO_x$ emissions, wherein the control parameters include ambient humidity, manifold pressure, manifold temperature, fuel rate, and engine speed associated with the engine. Further, the process may include adjusting the model based on a determination of whether the predicted $NO_x$ values meet a predetermined criteria associated with actual $NO_x$ values. The adjusted model may be stored in a memory associated with the engine whereby $NO_x$ emissions exhausted from the engine may be reduced based on virtual $NO_x$ emission values determined from the adjusted model.

34 Claims, 4 Drawing Sheets

NO$_x$ EMISSION-CONTROL SYSTEM USING A VIRTUAL SENSOR

TECHNICAL FIELD

This invention relates generally to emission-control systems, and more particularly to methods and systems for controlling NO$_x$ emissions using virtual sensors.

BACKGROUND

Growing government standards associated with combustion engine emissions have increased the burden on manufacturers to reduce the amount of nitrogen oxides (NO$_x$) and particulates that may be exhausted from their developed engines. Along with this burden is the manufacturer's commitment to their customers to produce fuel efficient engines. However, the sometimes inverse relationship between fuel economy and reduced emissions tends to make the task of reducing NO$_x$ while meeting customer needs a daunting one.

One known type of NO$_x$ reduction technique is Selective Catalytic Reduction (SCR). This technique of reducing NO$_x$ in a combustion engine generally includes the use of selective reagents, such as ammonia, aqueous urea, and other types of ammonia containing compounds. In a conventional open loop control urea based SCR system, a urea pump may inject a urea solution into the exhaust stream of a combustion engine through an atomizer. An SCR controller may control the rate of urea that is being applied to the atomizer. Within the exhaust stream, the urea solution may decompose into ammonia and carbon dioxide above certain temperatures, such as 160 degrees C. When the exhaust gas mixture is passed over a SCR catalyst, the NO$_x$ molecules react with the ammonia molecules over the catalyst sites and are reduced to molecular nitrogen.

The performance of a SCR catalyst to reduce NO$_x$ may depend upon may factors, such as catalyst formulation, the size of the catalyst, exhaust gas temperature, and urea dosing rate. With regard to the dosing rate, the NO$_x$ reduction efficiency tends to increase linearly until the dosing rate reaches a certain limit. Above the limit, the efficiency of the NO$_x$ reduction may start to increase in a slower rate. One reason for the decline in the NO$_x$ reduction efficiency is that the ammonia may be supplied at a faster rate that the NO$_x$ reduction process can consume. The excess ammonia, known as ammonia slip, may be expelled from the SCR catalyst which may constitute a source of unregulated emissions. A known technique for abating the ammonia slip is to add an oxidation catalyst behind the SCR catalyst. The oxidation catalyst may convert the ammonia back to NO$_x$ thus increasing oxide emissions. Accordingly, optimum NO$_x$ reduction can be achieved by maximizing the urea dosing rate while avoiding ammonia slip.

A known technique for controlling the urea dosing rate is through an open-loop control process. With the open-loop control process, a predetermined aqueous urea injection rate at a given engine operating load is used for NOx reduction. Due to varying ambient conditions (e.g., humidity, temperature, and pressure), however, the NO$_x$ expelled from an engine may vary. Accordingly, an SCR system employing an open-loop control process must allow for a sufficient margin in the urea dosing rate to ensure that NO$_x$ emissions standards are met while avoiding ammonia slip. Instituting these margins, however, may lead to under-dosing of the urea solution and loss of NOx reduction performance.

To compensate for the possible loss of performance, SCR systems have implemented closed-loop control processes. In these types of SCR systems, a NO$_x$ sensing device, such as a NO$_x$ sensor, is placed in the exhaust stream after the SCR catalyst. The sensing device may measure the level of NO$_x$ and provide signals to a SCR controller to adjust the urea dosing rate. Although NO$_x$ reduction efficiency may be maximized using a closed-loop control process, the costs and maintenance associated with NO$_x$ sensing devices make implementing these processes in a SCR system unattractive to engine manufacturers.

To minimize the costs associated with physical sensors, some conventional engine-control systems may implement virtual sensors. U.S. Pat. No. 6,236,908 issued to Cheng et al. shows a vehicle sensor system that stores one or more virtual sensors in the form of neural networks in an Engine Control Module (ECM) of an engine. In the sensor system taught by Cheng et al., the ECM receives values associated with various engine parameters from a plurality of physical sensors and applies various combination of the values to the neural network. Based on these input values, the network then produces values for one or more output parameters. The output values may reflect virtual data that replaces data that would have been received from physical sensors. For example, the neural network may receive various combinations of values from selected physical sensors, such as engine speed, manifold absolute pressure, exhaust gas recirculation, and air/flow ratio values. Based on the input values, the neural network may determine values of other engine operating parameters, including residual mass fraction, emissions, exhaust gas temperatures, and exhaust gas oxygen content. These virtual values may be used by the ECM to control various functions associated with the engine, including spark timing, fuel injection timing, and emissions.

Although Cheng et al. suggests the ability to control emissions through the use of virtual sensors, the control is based on parameters and/or engine functions not directly related to emission characteristics. For example, Cheng et al. teaches generally reducing NO$_x$ emissions by lowering peak temperatures during combustion in the engine. The peak temperatures are lowered by controlling various engine functions, such as throttle position to allow more gases to be trapped in a combustion chamber. The engine functions are controlled based on, among other things, a residual mass fraction value determined by a virtual sensor configured on selected input values including engine speed, manifold pressure, exhaust gas recirculation values, and air flow values. Accordingly, the attenuated relationship between emission control functions and selected input and output parameters associated with the virtual sensors taught by Cheng et al. decreases the efficiency and accuracy of the ECM in controlling emissions.

SUMMARY OF THE INVENTION

In an embodiment of the present invention, a process for controlling emissions of an engine is provided. The process may include determining predicted NO$_x$ values based on a model reflecting a predetermined relationship between control parameters and NO$_x$ emissions, wherein the control parameters include ambient humidity, manifold pressure, manifold temperature, fuel rate, and engine speed associated with the engine. Further, the process may include adjusting the model based on a determination of whether the predicted NO$_x$ values meet a predetermined criteria associated with actual NO$_x$ values. The adjusted model may be stored in a memory associated with the engine whereby NO$_x$ emissions exhausted from the engine may be reduced based on virtual NO$_x$ emission values determined from the adjusted model.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
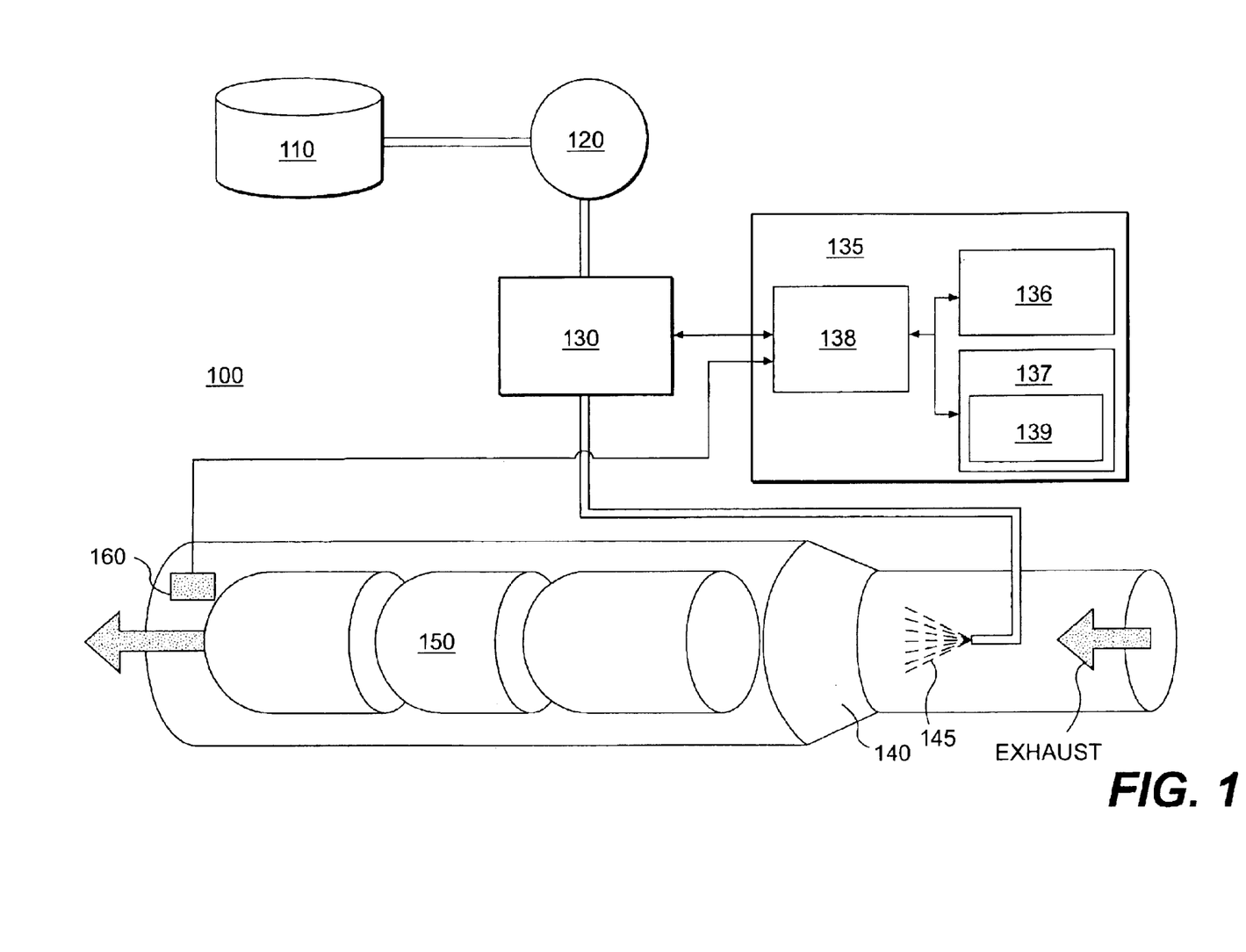
FIG. 1 illustrates a SCR system consistent with certain principles related to one embodiment of the present invention.

FIG. 1 illustrates an exemplary system 100 in which features and principles consistent with one embodiment of the present invention may be implemented. In one embodiment of the invention, system 100 may be associated with any type of machine engine, such as internal combustion type engines, that operate in various types of host systems. For example, system 100 may be affiliated with an engine associated with a marine vehicle, land vehicle, and/or an aircraft. Further, system 100 may be associated with an engine operating in a non-vehicle based system, such as machines operating within a manufacturing plant or generator sets. Moreover, while system 100 is shown for illustrative purposes in a urea-based SCR system, system 100 has potential use in other emission-control applications. Accordingly, one skilled in the art would recognize that system 100 may be associated with any type of host system that includes various types of engines that may operate in different environments with different emission-control systems and standards.

As shown in FIG. 1, system 100 may include a urea tank 110, urea pump 120, disbursement system or atomizer 130, SCR controller 135, exhaust system 140, and SCR catalyst 150. Urea tank 110 may be a reservoir used to hold gaseous, solid-based solutions, or aqueous solutions, such as urea, used as reagents in SCR systems. Urea pump 120 may be a device that is hardware or software controlled that extracts the urea solution from tank 110 into atomizer 130. Atomizer 130 may be a hardware or software controlled device that atomizes the urea solution and places the atomized solution 145 in exhaust system 140 based on control signals from SCR controller 135. In one embodiment of the present invention, an SCR catalyst 150 may be used to allow the $NO_x$ molecules within the exhaust gas mixture to react with ammonia molecules to produce molecular nitrogen. Alternatively, the exhaust system 140 may operate without an SCR catalyst 150.

Further, system 100 may include a physical $NO_x$ sensor 160 that is configured to measure and/or analyze $NO_x$ emissions exhausted from exhaust system 140 after the SCR catalyst 150. In one embodiment of the invention, sensor 160 may provide actual $NO_x$ emission values to SCR controller 135 based on operations of a target engine associated with system 100. Although FIG. 1 shows system 100 including physical $NO_x$ sensor 160, certain embodiments of the invention allow system 100 to operate with out the use of sensor 160.

SCR controller 135 maybe a processing system that monitors and controls operations of a system 100. Controller 135 may be configured to collect information from various sensors operating within system 100 and the host system and to provide control signals that affect the operations of system 100 and/or the host system. In one embodiment of the present invention, SCR controller may be part of an Engine Control Module (ECM) that monitors and controls the operation of an engine associated with system 100. For example, SCR controller may be a module programmed or hardwired within an ECM that performs functions dedicated to certain embodiments related to the present invention. In this example, SCR controller 135 may be software that is stored as instructions and data within a memory device of an ECM and is executed by a processor operating within the ECM. Alternatively, SCR controller 135 may be a module that is separate from other components of a host system.

FIG. 1 shows SCR controller 135 configured as a separate module dedicated to SCR control functions consistent with certain features related to one embodiment of the present invention. Controller 135 may include a processor 136, memory 137, and an interface 138. Processor 136 may be a processing device, such as a microcontroller, that may exchange data with memory 137 and interface 138 to perform certain processes consistent with features related to the present invention. Although a single processor is shown in FIG. 1, one skilled in the art would recognize that SCR controller 135 may include a plurality of processors that operate collectively to perform functions consistent with certain embodiments of the present invention.

Memory 137 may be any type of storage device that is configured to store information used by processor 136. For example, memory 137 may include magnetic, semiconductor, tape, and/or optical type storage devices that may be volatile or non-volatile in nature. Moreover, memory 137 may include one or more storage devices configured in various architectures, such as redundant configurations for fault tolerant operations. One skilled in the art would recognize that the type, configuration, and architecture of memory 137 may vary without departing from the spirit and scope of the present invention. In one embodiment of the present invention, memory 137 may store data reflecting a $NO_x$ virtual sensor 139.

Interface 138 may be an input/output interface device that receives data from processor 136 and from entities external to SCR controller 135. Further, interface 138 may also provide data to processor 136 and the external entities. Interface 138 may be a module that is based on hardware, software, or a combination thereof. In one embodiment of the present invention, interface 138 may receive signals from one or more physical sensors 160 that may be positioned in various locations within system 100 and/or the host system. Further, interface 138 may provide control signals from processor 136 to various components within system 100 and/or the host system, such as, for example, fuel injection components operating in an engine. One skilled in the art would recognize that the configuration of interface 138 may vary without departing from the scope of the present invention. For example, interface 138 may include separate communication ports dedicated for receiving and sending data, respectively. Alternatively, interface 138 may be integrated within processor 136 to provide and/or send data to and/or from one or more processing elements operating within processor 136.

In one embodiment of the invention, system 100 may be configured to maximize the efficiency of a $NO_x$ reduction process performed in exhaust system 140 using a $NO_x$ virtual sensor 139 maintained by SCR controller 135. The $NO_x$ virtual sensor 139 may be a software-based construct that determines the levels of $NO_x$ expelled from exhaust system 140 based on changes in ambient conditions and host system operating parameters. Based on the determined levels of $NO_x$ emissions, SCR controller 135 may provide control signals to an ECM (not shown) to adjust the operations of the engine to reduce $NO_x$ emissions. Alternatively, SCR controller 135 may adjust an emission control system, such as adjusting the urea dosing rate of system 100, based on the measured control parameters and predicted $NO_x$ values. The development of the $NO_x$ virtual sensor 139 may be based on various design and/or historical operating data associated with the type of host system associated with system 100.

In one embodiment of the present invention, a $NO_x$ virtual sensor 139 may be created by a test system that is configured to test various types of engines either during development or post operations (e.g., running an engine in a controlled environment after operations in real world conditions). The test system may include hardware and/or software that is used to manipulate test engines by applying various control variables to the test engines and collecting information associated with one or more response and control parameters. For example, the test system may include one or more processors, memory devices, interface devices, and any other component that may be used to perform processes consistent with certain features related to the present invention.

Figure 2:
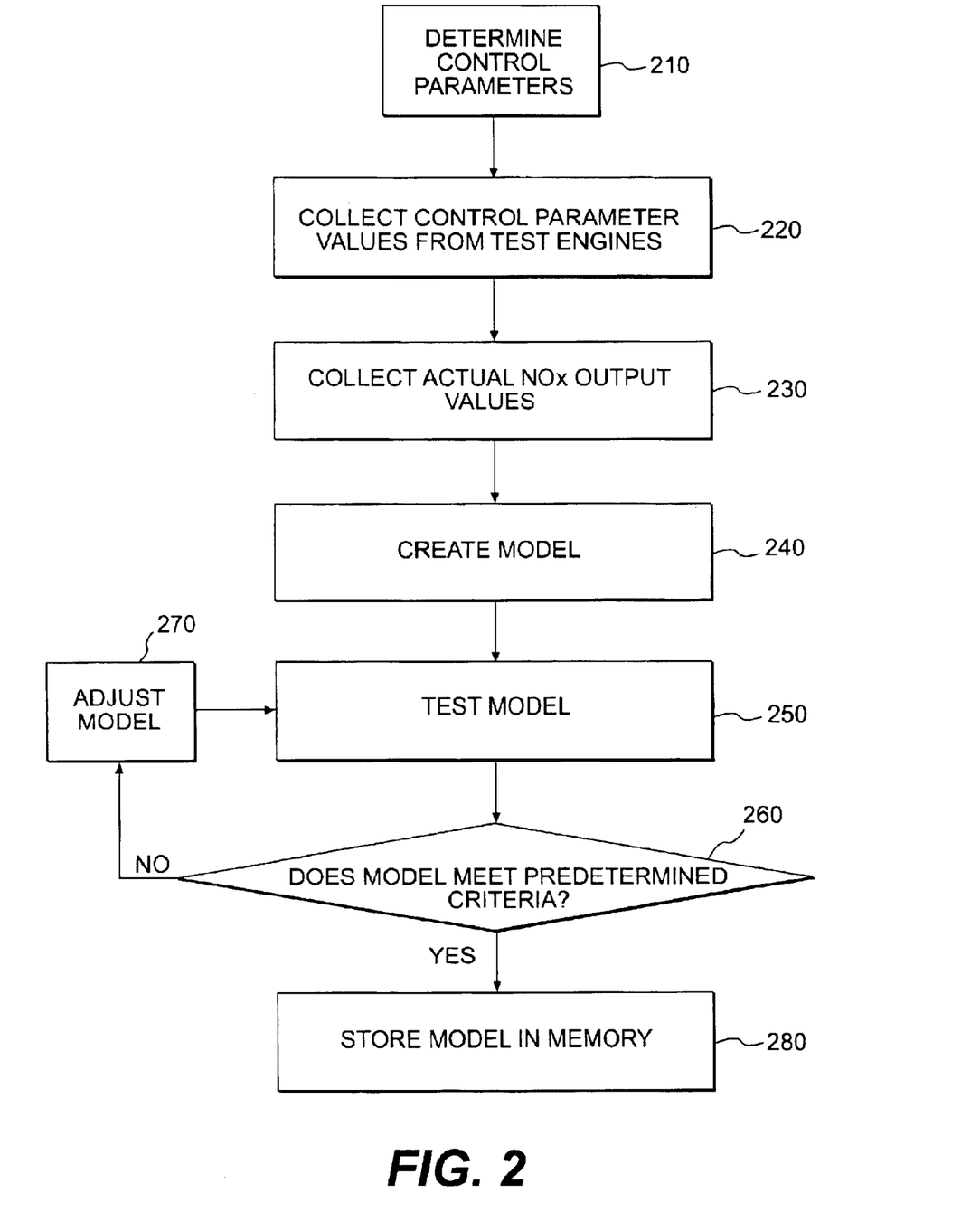
FIG. 2 illustrates a flowchart of an exemplary virtual sensor building process consistent with certain principles related to one embodiment of the present invention.

FIG. 2 shows a flowchart of an exemplary virtual sensor creation process consistent with certain features related to one embodiment of the present invention. Initially, to create a $NO_x$ virtual sensor 139, the test system may determine one or more control parameters associated with the type of target engine utilizing the $NO_x$ virtual sensor 139 (Step 210). The control parameters may be parameters that control the operations of various response characteristics of the engine. Further, the control parameters may be parameters that are associated with conditions corresponding to the operations of the engine For example, an engine's operating characteristics may vary based on fuel injection timing, compression ratios, turbocharger efficiency, after cooler characteristics, temperature values, pressure values, ambient conditions (e.g., humidity), fuel rates, and engine speeds.

Accordingly, the test system may determine one or more control parameters based on one or more response parameters, such as $NO_x$ emissions. In one embodiment of the present invention, the test system may determine that an engine's $NO_x$ emissions may vary based on selected control parameters, such as humidity and ambient temperature and pressures associated with the target engine. Accordingly, the relationship between $NO_x$ emissions and these control parameters may be determined by the test system in order to create a virtual sensor that may accurately predict $NO_x$ emissions. For example, the test system may create a model that may predict the emission behavior of a diesel engine by monitoring and/or modeling the operating characteristics of a plurality of test diesel engines of similar types.

In one embodiment of the present invention, the test system may determine the control parameters that may provide an accurate relationship between $NO_x$ emissions and various operating parameters associated with a target engine type. These control parameters may then be used for creating the $NO_x$ virtual sensor 139. For example, based on previous modeling and monitoring processes, the test system may determine that humidity may cause a significant change in $NO_x$ emissions for an engine. Other control parameters may be determined to have a significant impact on $NO_x$ emissions as well, such as intake manifold temperature, intake manifold pressure, fuel rate, and engine speed. Accordingly, in one embodiment of the present invention, the control parameters determined by the test system in Step 210 may include, but not be limited to, ambient humidity (H), intake manifold pressure (Pint), intake manifold temperature (Tint), fuel rate (Mf), and engine speed (N). One skilled in the art may recognize that other operating parameters may have an impact on $NO_x$ emissions and these other parameters may also be used by the test system to create a virtual sensor.

Once determined, the test system may expose one or more test engines to test operations and collect values for each of the control parameters associated with each test engine during the test operations (Step 220). Further, the test system may collect corresponding actual $NO_x$ emission values from each of the test engine's exhaust systems (Step 230). The collected $NO_x$ emission values may be stored in a memory device associated with the test system. Each of the test engines may have similar characteristics, such as, for example, diesel engines with similar design specifications. The test system may vary the values of the control parameters in different combinations to collect a plurality of $NO_x$ emission values. Based on the collected $NO_x$ emission and control parameter values, the test system may create a model that reflects a relationship between the $NO_x$ emissions and the control parameters associated with the type of engines being tested (Step 240).

In one embodiment of the present invention, the model may be a mathematical construct that reflects a relationship between the $NO_x$ emissions and the control parameters determined in Step 210. Accordingly, the $NO_x$ emissions for each type of engine may be represented as a function based on the determined control parameters. For example, in one embodiment of the present invention, the mathematical model may be reflected as a function:

$$NO_x = f(H, P_{int}, T_{int}, M_f, N),$$

where H may be the ambient humidity measured from a humidity sensor placed in an air induction system before a compressor inlet, $P_{int}$ may be the intake manifold pressure, $T_{int}$ may be the intake manifold temperature, $M_f$ may be the fuel rate, and N may be the engine speed, all associated with the target engine that is associated with the model. Accordingly, the model created by the testing system may be used to predict the level of $NO_x$ emissions from a target engine based on the values of the control parameters H, $P_{int}$, $T_{int}$, $M_f$, and N. Thus, the generated model may act as a $NO_x$ virtual sensor that operates similar to a physical $NO_x$ sensor by providing values associated with $NO_x$ emissions associated with the target engine exhaust. Accordingly, the terms "model" and "$NO_x$ virtual sensor" described below may be used interchangeably.

Figure 3:
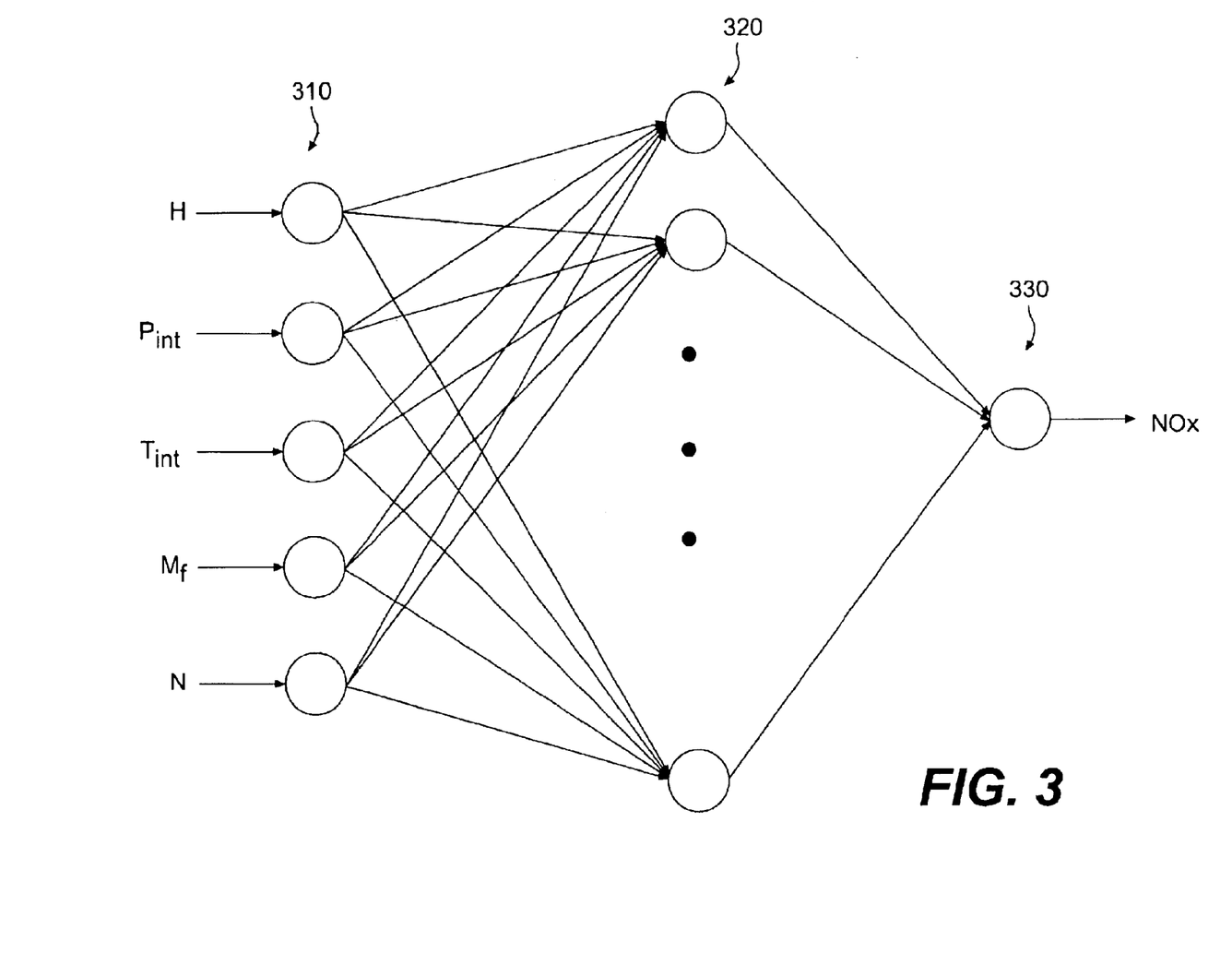
FIG. 3 illustrates an exemplary neural network consistent with certain principles related to one embodiment of the present invention.

In one embodiment of the present invention, the model (virtual sensor 139) may be associated with a neural network that accepts the determined control parameters as inputs and produces a predicted $NO_x$ value as an output. The neural network may be configured in a number of different well known neural network configurations, such as a back propagation or a feed forward network. FIG. 3 shows a block diagram of an exemplary neural network that may represent the virtual sensor 139.

As shown, the neural network may include an input layer 310, a hidden layer 320, and an output layer 330. The input layer 310 may receive the control parameters (H, $P_{int}$, $T_{int}$, $M_f$, and N, for example) at respective input nodes. These parameter values may each be provided to a node in the hidden layer 320 over links 315 that have a weight associated with each respective input and hidden layer node. The weights associated with links 315 may have values that are zero or negligible. Each node in the hidden layer 320 may perform a function on the incoming signals that may be a composite of the weights associated with links 315 and a transfer function. Each node in the hidden layer 320 may apply the same transfer function to the signals received from the nodes in the input layer 310. For example, in one type of neural network, each parameter value is multiplied by the weight associated with its respective link, and then each node sums the values of each parameter (multiplied by its weight). This number is then used as the input to a two dimensional map, typically a sigmoid, etc. Each node in the hidden layer 320 may, in turn, provide an output signal over a link 325 to the output node in the output layer 330 which may produce a predicted value corresponding to the response parameter, in this case a $NO_x$ emission value. The links 325 extending from each node in the hidden layer 320 may also have an associated weight. As with the weights associated with links 315, the weights associated with links 315 may have values that are zero or negligible.

The operations of neural networks are well known and methods and systems consistent with certain features related to embodiments of the present invention may incorporate various types of neural networks to produce data reflecting a predicted $NO_x$ emission value based on the control parameters provided at the input layer 310. For example, although FIG. 3 shows the hidden layer 320 with one level of nodes and a single output node in output layer 330, one skilled in the art would recognize that more than one level of nodes may be included within hidden layer 320 and more than one node may be included in output layer 330 associated with different response parameters. For example, a second output node (not shown) could be included to output values associated with fuel rate, exhaust manifold temperature, turbo speed, torque, etc.

Referring back to FIG. 2, to ensure that the model created by the test system may accurately predict $NO_x$ emission values for a target engine, in embodiments of the invention, the test system may test the model (Step 250). In one embodiment of the present invention, the test system may apply test values for each control parameter to the model to determine a predicted set of $NO_x$ emission values. Further, the target system may be exposed to test operations that produce the same values for each control parameter as those applied to the model. The test system may then collect actual $NO_x$ emission values from a physical $NO_x$ emission sensor associated with the target system. In one embodiment of the invention, the physical $NO_x$ emission sensor may be included in the exhaust system associated with the target engine as a permanent component or may be temporarily attached to the exhaust system for testing purposes.

The test system may then compare the actual and predicted $NO_x$ values to determine whether the model meets a predetermined criteria (Step 260). For example, the predetermined criteria may be associated with a threshold value that reflects a maximum acceptable difference between the actual and predicted $NO_x$ values. One skilled in the art would recognize that a number of different conditions, thresholds, etc. may be applied as the predetermined criteria without departing from the scope of the present invention.

If the model does not meet the predetermined criteria (Step 260; NO), the model may be adjusted (Step 270) and re-tested until the predetermined criteria is met (Step 260; YES). Once the model produces accurate predicted $NO_x$ emission values based on the determined control parameters, the test system may store the model in memory 137 of SCR controller 135 of system 100 (Step 280) prior to exposing the target engine to operations in real world environments.

In one embodiment of the present invention, when the model is configured as a neural network and the model does not meet the predetermined criteria, the test system may adjust the weights associated with the links corresponding to the nodes in the network's hidden layer to compensate for previous inaccurate predictions of $NO_x$ emission values. For example, if the neural network includes more than one level of nodes in the hidden layer 320, the weights associated with each link interconnecting the hidden layer nodes may be adjusted to train the network to produce more accurate $NO_x$ emission values. The weight adjustments may be performed by any number of known algorithms executed by the test system that are used for training neural networks, such as algorithms associated with radial basis function approximations. One skilled in the art would recognize that certain embodiments of the present invention may employ different algorithms that affect the learning process of the neural network.

As previously described, once a trained model is stored in SCR controller 135, the target engine may be commissioned for operation. That is, the target engine may be provided in a host system (e.g., tractor, highway-based vehicle, stationary plant equipment, etc.) and exposed to real world operations. During these operations, the ambient and engine operating conditions may be monitored and measured by physical sensors, an ECM, and/or SCR controller 135. The measured values associated with the engine's operations may be provided to SCR controller 135 as control parameters for the model stored in memory 137. For instance, during operation, values reflecting humidity H, intake manifold pressure $P_{int}$, intake manifold temperature $T_{int}$, engine speed N, and fuel rate $M_f$ associated with the target engine may be provided to SCR controller 135 through interface 138. These values may be used by SCR controller 135 to determine $NO_x$ emission values using the model stored in memory 137. Based on the determined $NO_x$ values, SCR controller 135 may provide control signals that are used by system 100 for minimizing, or otherwise affecting $NO_x$ emissions exhausted from exhaust system 140. In one exemplary embodiment, based on the predicted $NO_x$ emission values, SCR controller 135 may provide control signals that adjust the dosing rate of the urea solution provided to exhaust system 100 in order to enhance or minimize $NO_x$ emissions. Accordingly, system 100, and the target engine, may perform emission enhancing or minimization processes during operations without the use of costly physical $NO_x$ sensors or analyzers.

Because the performance of a target engine may vary based on the engine's application, it may be desirable to fine tune the model based on desired or actual engine operations. In one embodiment of the present invention, system 100 may incorporate $NO_x$ sensors to accomplish this fine tuning. To reduce costs, it may be desirable to use a sensor having a relatively short expected life. For example, a physical $NO_x$ sensor that is more susceptible to failure than more expensive fault tolerant $NO_x$ sensors may be placed at the output of the exhaust system 140 and used by system 100 to fine tune the operation of the model stored in SCR controller 135 during real world operations.

Figure 4:
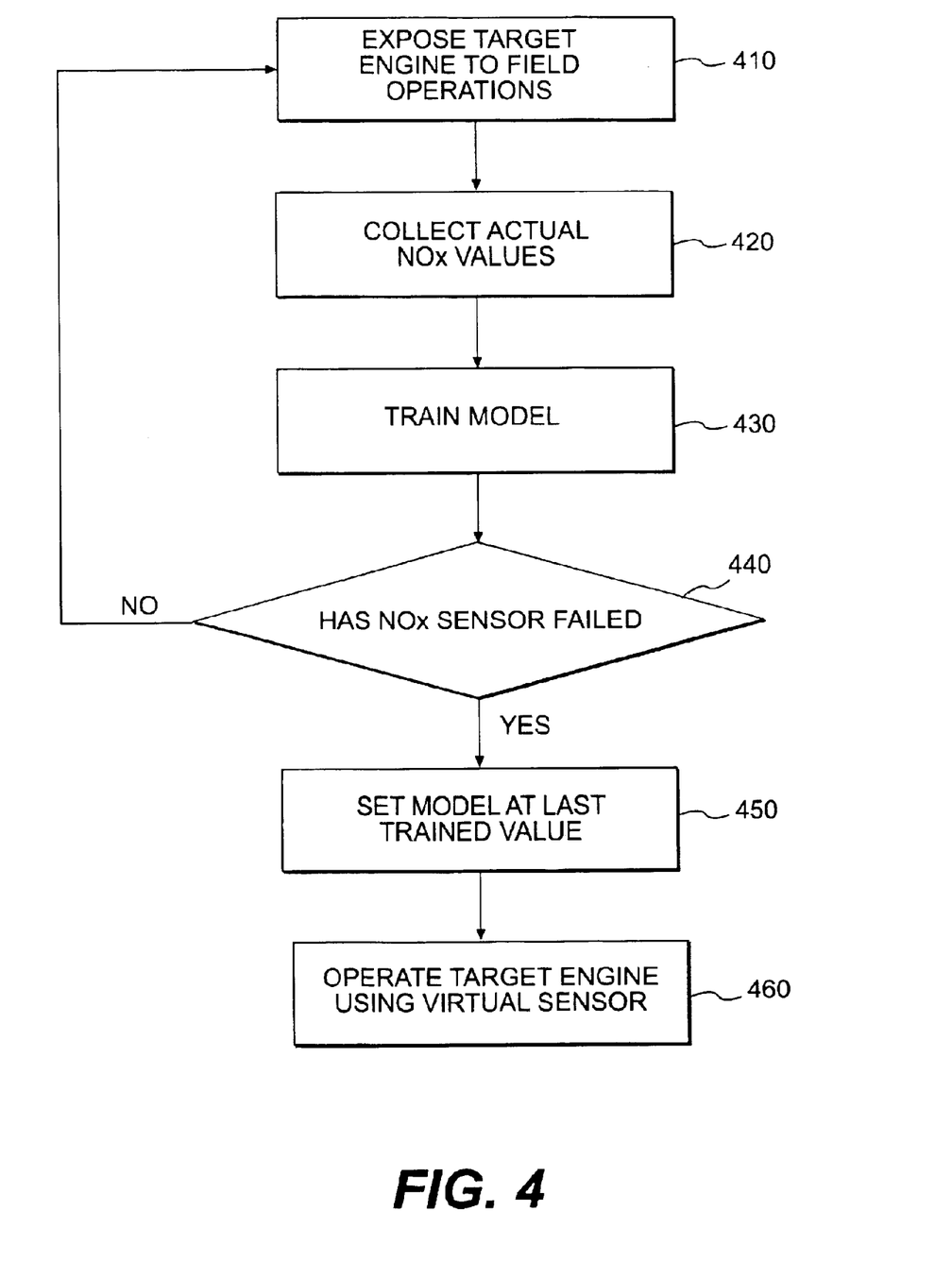
FIG. 4 illustrates a flowchart of an exemplary training process consistent with certain principles related to one embodiment of the present invention.

FIG. 4 shows a flowchart of an exemplary training process that may be implemented by methods and systems consistent with certain features related to embodiments of the present invention. As shown, a target engine that includes system 100 and a model stored in memory 137 may be exposed to operations, such as field operations that take place in a work environment (Step 410). During these operations, SCR controller 135 may collect actual $NO_x$ emission values from an accurate physical sensor 160 placed after the SCR catalyst 150 (Step 420). Further, SCR controller 135 may collect the corresponding values of the control parameters (e.g., H, Pint, Tint, Mf, and N) that are known to affect the $NO_x$ emission values. The control parameters may be collected from physical sensors and/or from an ECM operating in the target engine. The actual $NO_x$ values and corresponding control parameter values may be used to train the model (Step 430) stored in memory 137 during the operations in a manner similar to that described above with respect to Steps 250–270 in FIG. 2. That is, SCR controller 135 may apply the control parameter values to the model stored in memory 137 to produce predicted $NO_x$ emission values. The predicted $NO_x$ values may then be compared to the collected actual $NO_x$ values, and based on the comparison, the model may be adjusted (e.g., the weights of the neural network may be adjusted until the predicted $NO_x$ values meet predetermined criteria). In one embodiment of the present invention, during training, the SCR controller 135 may create or update a map reflecting the relationship between the $NO_x$ values and the control parameters values. The map may be used by an ECM to control the operation of the target engine to minimize $NO_x$ emissions during real world operations. Alternatively, the map may be used by SCR controller 135 to adjust the urea dosing rate in system 100.

In one embodiment of the invention, the model stored in the SCR controller 135 may be continuously trained using the physical $NO_x$ sensor values until the sensor 160 fails (Step 440; YES). System 100 may detect a failure of the physical $NO_x$ sensor 160 using a number of different fault detection techniques known to those skilled in the art. For example, system 100 may be configured to receive a fault detection signal from a device that houses the physical $NO_x$ sensor 160 when the sensor 160 fails to produce sensor signals. Alternatively, SCR controller 135 may be configured to determine when the physical $NO_x$ sensor 160 has stopped providing a sensor signal, such as in well known watchdog type processes. One skilled in the art would recognize that the manner by which system 100 detects a failure of the physical $NO_x$ sensor is not limited to the above examples and various fault detection techniques may be implemented without departing from the scope of the present invention.

Once the system detects that the physical $NO_x$ sensor 160 has failed, SCR controller 135 may be configured to set the model based on the trained values incorporated into the model prior to the failure of the physical $NO_x$ sensor 160. In the exemplary embodiment of FIG. 4, the controller 135 sets the model at the last trained value (Step 450). Setting the model may be associated with terminating training and fixing the model weights associated with the neural network. Also, the last trained value is not intended to be limited to a single data value or point, but may also reflect a multitude of operating points. Further, SCR controller 135 may update the map created during training. In one embodiment of the present invention, SCR controller 135 may place the model and/or map in another memory device that has greater fault tolerant capabilities than memory 137. For example, to set the model, processor 136 may copy the model and/or the updated map to a non-volatile memory device that may be configured to withstand multiple types of failures. System 100 may then operate the target engine and system 100 in subsequent operations using the virtual sensor 139 stored in SCR controller 135 (Step 460). Accordingly, system 100 may enhance or minimize $NO_x$ emissions of the target system during the subsequent operations based on predicted $NO_x$ emission values produced by the trained model stored in SCR controller 135. For example, system 100 may be configured to adjust the dosing rate of a urea-solution deposited into exhaust system 140 based on predicted $NO_x$ emission values. Alternatively, SCR controller 135 and/or an ECM may use the predicted $NO_x$ emission values to produce control signals that adjust one or more operating parameters associated with the target engine, such as fuel injection timing, valve positions, injection rates, etc. The control signals may affect the operation of engine components, emissions control components, or both.

INDUSTRIAL APPLICABILITY

Methods and systems consistent with certain features related to the present invention allow a target engine to minimize $NO_x$ emissions based on a virtual $NO_x$ sensor that may be trained based on the specific application of the target system. Moreover, by properly modeling the virtual $NO_x$ sensor using a selected set of control parameters, the virtual sensor can provide reliable and accurate information that obviates the need for physical sensors that are expensive, prone to errors, and require significant maintenance.

In one embodiment of the present invention, the exemplary virtual sensor creation process may be performed by SCR controller 135 or an ECM associated with system 100, instead of a test system. For example, SCR controller 135 or an ECM may be configured to perform model testing processes based on the on-site connection of a physical $NO_x$ sensor 160 placed in the exhaust output of system 140. That is, a physical sensor 160 may be brought to the target engine on-site and connected to exhaust system 140. In this embodiment of the invention, interface 138 may receive a connection signal from a device that may receive the physical $NO_x$ sensor 160. Accordingly, when SCR controller 135 detects the connection signal, processor 136 may begin the virtual sensor creation process for generating a $NO_x$ virtual sensor 139. When the creation process is completed, and the $NO_x$ virtual sensor 139 is set, processor 136 may store the virtual sensor 139 in memory 137 for use during operations. The physical $NO_x$ sensor 160 may then be removed and used to retrain another target engine or may be provided at a later time to tweak the performance of system 100. Therefore, for example, when a target engine is exposed to a different work application, such as a different work site, a physical $NO_x$ sensor 160 may be brought to the new work site to retrain the model stored in memory 137.

In another embodiment of the present invention, a target engine may be identified with a particular desired work application, and the model may be re-trained to ensure accurate $NO_x$ emission predictions during actual work operations associated with the desired application. A desired work application of a model may be associated with work environments, such as farming environments, construction site environments, mining environments, etc. Further, a model may be re-trained based on the type of target engine. The type of a target engine may be associated with performance specifications corresponding to the engine, such as threshold values, maximum operating limits, physical characteristics of the engine, etc. Accordingly, a test system may be configured with a storage device that maintains historical operation data for various work applications associated with various types of engines. For example, a test system may include various files associated with various target engines having particular performance specifications. The files may include historical operation data reflecting collected real world $NO_x$ emissions data based on corresponding measured values of control parameters associated with operations of a plurality of engines. Corresponding control parameters may be applied to the model stored in the SCR controller 135 of the target engine to re-train the model. In one embodiment of the invention, the test system may use a physical $NO_x$ emission sensor 160 to validate the accuracy of the re-trained model in a manner similar to the process performed in FIG. 2. Alternatively, the test system may use the historical feedback data as actual $NO_x$ emission values to fine tune the predicted $NO_x$ emission value produced by the model. Therefore, an engine manufacture, for example, may create a generic model for various types of engines and subsequently fine tune the model based on a desired application or engine type for individual target engines.

In another embodiment of the present invention, a test system may determine a set of control parameters used to create a $NO_x$ virtual sensor 139 based on the type of target engine. For example, based on historical operating data, a test system may determine that a first type of engine with a first set of design specifications (e.g., operational thresholds, limits, etc.) may have different control parameters that impact $NO_x$ emissions as compared with a second type of engine. Accordingly, the test system may include additional or fewer control parameters used for a first type of engine to generate a $NO_x$ virtual sensor as compared with a second type of engine.

In yet another embodiment of the present invention, SCR controller 135 may maintain a log file of historical operating conditions based on operations of the target engine with which system 100 is associated. The log file may be maintained in memory 137 or in another local or remote memory device and may include a map of the relationship between selected control parameters and predicted and/or actual $NO_x$ emission values. The log file may be downloaded to a remote memory device by a test system if the target engine is brought to a test site, or alternatively, may be downloaded to a portable system that is brought to the work site where the target engine is located. The downloaded log file may be provided to a test system and used to provide historical operating condition data that is used to create and/or train $NO_x$ virtual sensors used in other target engines.

In another embodiment of the invention, memory 137 may include a plurality of processors that individually and/or collectively may perform one or more processes consistent with certain features related to the present invention. For example, SCR controller 135 may be configured to execute program code stored in memory 137 that represents the $NO_x$ virtual sensor 139. Further, memory 137 may include program code that performs processes, when executed by processor 136, for training the virtual sensor 139. Accordingly, one skilled in the art would recognize that SCR controller 135 may be configured to perform one or more software based processes that reflect the features and principles related to certain embodiments of the present invention.

As described, the SCR controller 135 may take action if a predicted $NO_x$ is above a predetermined threshold value (e.g., does not meet a predetermined criteria). The action taken by SCR controller 135 may be on an engine, emissions control devises, or both. For example, the control parameters may be adjusted directly, or indirectly, to reduce actual $NO_x$ emissions produced by system 100. Further, SCR controller 135 may consider engine performance when making changes that adjust the values of the control parameters determined by a test system, for example. For example, fuel injection timing may be changed in conjunction with fuel rate to maintain selected levels of power while affecting $NO_x$ emissions.

The features, embodiments, and principles of the present invention may be implemented in various environments. Such environments and related applications may be specially constructed for performing the various processes and operations of the invention. The processes disclosed herein are not inherently related to any particular system, and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling $NO_x$ emissions of an engine, comprising:
    determining predicted $NO_x$ values based on a model reflecting a predetermined relationship between control parameters and $NO_x$ emissions, wherein the control parameters include ambient humidity, manifold pressure, manifold temperature, fuel rate, and engine speed associated with the engine;
    adjusting the model based on a determination of whether the predicted $NO_x$ values meet a predetermined criteria associated with actual $NO_x$ values;
    storing the adjusted model in a memory associated with the engine; and
    reducing $NO_x$ emissions exhausted from the engine based on virtual $NO_x$ emission values determined from the adjusted model.

2. The method of claim 1, wherein reducing $NO_x$ emissions includes:
    operating the engine; and
    determining the virtual $NO_x$ emission values based on values for each of the control parameters collected during the operation of the engine and the stored adjusted model.

3. The method of claim 1, wherein the actual $NO_x$ values are obtained from a physical $NO_x$ sensor that measures actual $NO_x$ emission values based on measured values of the control parameters obtained during a previous operation of the engine.

4. The method of claim 1, wherein reducing $NO_x$ emissions includes:
    minimizing $NO_x$ emissions exhausted from the engine based on the virtual $NO_x$ x emission values.

5. The method of claim 1, wherein reducing $NO_x$ emissions includes:
    adjusting an operating parameter of the engine.

6. The method of claim 1, where reducing $NO_x$ emissions includes:
    adjusting a urea solution dosing rate applied to the engine exhaust.

7. The method of claim 1, wherein the model is a neural network, the control parameters being provided as inputs to the neural network and the predicted $NO_x$ emission values being produced as outputs of the neural network.

8. The method of claim 7, wherein adjusting the model includes:
adjusting mathematical weights associated with nodes included in the neural network until the predicted $NO_x$ values meet the predetermined criteria.

9. The method of claim 1, wherein the predetermined criteria is associated with a value reflecting an acceptable difference between the predicted $NO_x$ values and the actual $NO_x$ values.

10. The method of claim 1, wherein determining virtual $NO_x$ emission values includes:
applying the values for each of the control parameters collected during the operation of the engine to the stored adjusted model to produce the virtual $NO_x$ emission values.

11. The method of claim 1, wherein prior to determining predicted $NO_x$ values based on a model, the method includes:
collecting test values of each of the control parameters from each of a plurality of sample engines during respective operations;
collecting actual test $NO_x$ emission values from each of the sample engines based on the collected test values of the control parameters; and
creating the model based on a relationship between the actual test $NO_x$ emission values and the test values for the control parameters.

12. A method for controlling $NO_x$ emissions of an engine that includes a physical $NO_x$ sensor that measures actual $NO_x$ emission values produced by the engine during operation and a controller including a model that produces predicted values of $NO_x$ emissions based on collected values of control parameters corresponding to the engine during the operation, the method comprising:
collecting actual $NO_x$ emission values from the physical $NO_x$ sensor and corresponding values for each of the control parameters during operations of the engine;
applying the collected control parameter values to the model to produce predicted $NO_x$ emission values;
training the model during the operations based on an analysis of the predicted $NO_x$ emission values and the actual collected $NO_x$ emission values;
determining whether the physical $NO_x$ sensor has failed;
setting the trained model based on a training that occurred immediately prior to the physical $NO_x$ sensor failure; and
controlling $NO_x$ emissions exhausted from the engine during subsequent operations based on predicted $NO_x$ emission values produced from the trained model in response to collected values associated with each of the control parameters during the subsequent operations.

13. The method of claim 12, wherein the control parameters include ambient humidity, manifold pressure, manifold temperature, fuel rate, and engine speed associated with the engine.

14. The method of claim 12, wherein the model is a neural network that receives the control parameters as inputs and generates the predicted $NO_x$ emission values as an output.

15. The method of claim 12, wherein setting the trained model includes:
storing the trained model in a non-volatile memory device within the controller.

16. A method for adjusting the performance of an emission-control system associated with a target engine, wherein the emission-control system includes a controller, the method comprising:
creating a model reflecting a relationship between $NO_x$ emission values produced by at least one test engine and control parameters collected during test operations of the at least one test engine;
adjusting the model to a first trained state;
storing the adjusted model in the controller;
determining characteristics associated with the target engine;
readjusting the model stored in the controller to a second trained state based on the determined characteristics; and
controlling $NO_x$ emissions exhausted from the target engine during operations based on predicted $NO_x$ emission values produced by the readjusted model.

17. The method of claim 16, wherein adjusting the model to a first trained state includes:
applying test values of each control parameter to the model to produce predicted $NO_x$ emission values; and
adjusting the model to the first trained state based on a determination whether the predicted $NO_x$ values meet a predetermined criteria associated with actual $NO_x$ values obtained from a physical $NO_x$ sensor that measures $NO_x$ emission values exhausted from the target engine.

18. The method of claim 16, wherein the control parameters include ambient humidity, manifold pressure, manifold temperature, fuel rate, and engine speed.

19. The method of claim 16, wherein the characteristics associated with the target engine include at least one of a specific operating criteria and a desired work application for the target engine.

20. The method of claim 16, wherein readjusting the model includes:
readjusting the model stored in the controller based on a comparison of $NO_x$ emission values produced by the model and actual $NO_x$ emission values collected from previous operations of a plurality of field engines that each have the same determined characteristics as the target engine.

21. The method of claim 20, wherein each field engine is included in a host system and the determined characteristics of the field engines include at least a work environment that each host system was previously operated.

22. The method of claim 19, wherein the characteristics of the field engines include performance specifications associated with each field engine.

23. The method of claim 16, wherein readjusting the model includes:
collecting historical operating data associated with one or more engines that have the same determined characteristics as the target engine, wherein the historical operating data includes measured values for each of the control parameters and corresponding measured $NO_x$ emission values associated with each of the one or more engines during previous operations;
applying the measured values of the control parameters to the stored model to produce predicted $NO_x$ emission values; and
readjusting the stored model based on an analysis associated with the predicted $NO_x$ emission values and the measured $NO_x$ emission values associated with the one or more engines.

24. A system for controlling $NO_x$ emissions of an engine, the system comprising:

a controller configured to:
receive measured values of each of a plurality of control parameters during operations of the engine, wherein the control parameters include ambient humidity, manifold pressure, manifold temperature, fuel rate, and engine speed,
predict $NO_x$ emission values of the engine based on values associated with each of the plurality of control parameters, and
produce control signals as a function of the predicted $NO_x$ emission values; and
a system coupled with the controller to receive the control signals and configured to control $NO_x$ emissions exhausted from the engine as a function of the control signals.

25. The system of claim 24, wherein the controller includes a memory including program code configured to, when executed by a processor, predict $NO_x$ emission values of the engine as a function of each of the plurality of control parameters.

26. The system of claim 24, wherein the controller includes an interface coupled with the engine and operable to receive the measured values of each of the plurality of control parameters during operations of the engine.

27. The system of claim 26, wherein the interface is coupled with the engine through one or more sensors that collect the measured values of each of the plurality of control parameters during operations of the engine.

28. The system of claim 24, wherein the controller includes a processor coupled with the system configured to execute program code to produce the predicted $NO_x$ emission values and the control signals as a function of the predicted $NO_x$ emission values.

29. The system of claim 25, wherein the program code represents a neural network that uses the control parameters as inputs and generates the predicted $NO_x$ emission values as outputs when executed by the processor.

30. The system of claim 24, wherein the system configured to control $NO_x$ emissions is a urea-based selective catalytic reduction system.

31. The system of claim 24, wherein the system configured to reduce $NO_x$ emissions includes an engine control unit coupled with the controller to receive the control signals and configured to adjust one or more operating parameters of the engine.

32. A system for controlling $NO_x$ emissions of an engine, the system comprising:
a physical $NO_x$ sensor that measures actual $NO_x$ emission values produced by the engine during operation; and
a controller including software that performs emission control processes, when executed by a processor, the emission control processes including:
a process for providing predicted values of $NO_x$ emissions based on collected values of control parameters corresponding to the engine during the operation;
a process for collecting actual $NO_x$ emission values from the physical $NO_x$ sensor and corresponding values for each of the control parameters during the operation of the engine;
a process for training the process for providing predicted $NO_x$ emission values during the operation based on an analysis of the predicted $NO_x$ emission values and the actual $NO_x$ emission values;
a process for determining whether the physical $NO_x$ sensor has failed; and
a process for controlling $NO_x$ emissions exhausted from the engine during subsequent operation based on predicted $NO_x$ emission values produced from the trained process for predicting in response to collected values associated with each of the control parameters during the subsequent operation.

33. An apparatus for controlling $NO_x$ emissions from an engine, comprising:
a controller including:
a memory including program code configured to predict $NO_x$ emission values of the engine based on values associated with each of the plurality of control parameters, wherein the program code represents a neural network that uses the control parameters as inputs and generates the predicted $NO_x$ emission values as outputs,
an interface coupled with the engine and configured to receive measured values of each of a plurality of control parameters during operations of the engine, wherein the control parameters include ambient humidity, manifold pressure, manifold temperature, fuel rate, and engine speed, and
a processor coupled with the memory and the interface and configured to execute the program code to produce predicted $NO_x$ emission values as a function of the received measured values and to produce control signals as a function of the predicted $NO_x$ emission values; and
a system coupled with the processor to receive the control signals and configured to control $NO_x$ emissions exhausted from the engine as a function of the control signals.

34. An apparatus for controlling $NO_x$ emissions from an engine, comprising:
an engine;
an exhaust system coupled with the engine to process emissions produced by the engine during operation;
a physical $NO_x$ sensor coupled with the exhaust system and configured to measure actual $NO_x$ emission values produced by the engine during operation; and
a controller coupled with the physical $NO_x$ sensor and the engine and configured to:
collect actual $NO_x$ emission values from the physical $NO_x$ sensor and corresponding values for each of a plurality of engine control parameters from the engine during operation, wherein the control parameters include ambient humidity, manifold pressure, manifold temperature, fuel rate, and engine speed associated with the engine during operation;
apply the collected control parameter values to a neural network to produce predicted $NO_x$ emission values;
train the neural network during operation of the engine based on an analysis of the predicted $NO_x$ emission values and the actual collected $NO_x$ emission values;
determine whether the physical $NO_x$ sensor has failed;
set the trained neural network based on a training that occurred immediately prior to the physical $NO_x$ sensor failure; and
provide control signals to the engine, wherein the control signals control $NO_x$ emissions exhausted from the engine during subsequent operations based on predicted $NO_x$ emission values produced from the trained neural network in response to collected values associated with each of the control parameters during the subsequent operations.

* * * * *